United States Patent [19]

Fujita et al.

[11] Patent Number: 4,718,733
[45] Date of Patent: Jan. 12, 1988

[54] AUTOMATIC REVERSE SPEED CONTROL DEVICE INCLUDING PUMP AND BRAKE RESTRICTING MEANS

[75] Inventors: Haruyasu Fujita, Tokyo; Yasunori Ookuma, Asaki; Kenji Honma, Shiki, all of Japan

[73] Assignee: Honda Giken Kogyo Kabushiki Kaisha, Tokyo, Japan

[21] Appl. No.: 790,002

[22] Filed: Oct. 22, 1985

[30] Foreign Application Priority Data

Nov. 8, 1984 [JP] Japan ................. 59-234168
Nov. 8, 1984 [JP] Japan ................. 59-234169

[51] Int. Cl.$^4$ ............................. B60T 13/16
[52] U.S. Cl. ............................. 303/2; 180/170; 180/271; 188/180; 188/181 A; 303/10; 303/116; 192/4 A
[58] Field of Search ......... 303/10, 11, 12, 2-3, 303/100, 116, 61, 117, 113, 110, 18; 188/181, 180, 110; 192/3, 4 A, 4 C, 0.044; 417/328, 519, 569; 180/170-179, 271-275; 280/DIG. 14

[56] References Cited

U.S. PATENT DOCUMENTS

| | | | |
|---|---|---|---|
| 3,588,193 | 6/1971 | Drutchas | 303/10 X |
| 3,661,427 | 5/1972 | Hodge | 303/10 X |
| 3,724,914 | 4/1973 | Skoyles | 303/10 X |
| 3,804,193 | 4/1974 | Ikuta | 180/170 |
| 4,355,607 | 10/1982 | Blaney | 180/170 X |
| 4,611,561 | 9/1986 | Suyama | 180/175 X |

FOREIGN PATENT DOCUMENTS 59-155545 9/1984 Japan.

Primary Examiner—Douglas C. Butler
Attorney, Agent, or Firm—Armstrong, Nikaido, Marmelstein & Kubovcik

[57] ABSTRACT

According to progress of a vehicle, a pump is actuated to feed fluid into a brake pipe. The discharge of the pump is generally proportioned to vehicle speed. On the other hand, the fluid within the brake pipe is relieved to an upper stream side of the pump at a predetermined flow rate regulated by an orifice. Accordingly, when the flow rate of the fluid fed by the pump is less than the predetermined flow rate, in other words, when the vehicle speed is less than the predetermined speed, pressure within the brake pipe is not increased. However, when the discharge of the pump exceeds the predetermined flow rate, the pressure within the brake pipe is increased. Due to this increased pressure, a vehicle wheel braking device is actuated to brake the wheels. Thus, vehicle speed is lowered. Since the pump discharges fluid in one direction or the other direction according to forward and backward movement of the vehicle, the pump can be functioned as a reverse speed restricting device when the vehicle moves backwardly and as a vehicle speed sensor for vehicle speed responsive control devices when the vehicle moves forwardly.

3 Claims, 9 Drawing Figures

AUTOMATIC REVERSE SPEED CONTROL DEVICE INCLUDING PUMP AND BRAKE RESTRICTING MEANS

BACKGROUND OF THE INVENTION

The present invention relates to a speed control device for automatically controlling a speed of vehicles such as automobile and motor tricycle, so that a speed thereof will not exceed a certain level.

Generally, when a driver drives a vehicle such as automobile and motor tricycle which are equipped with a reverse gear, it is a usual practice for the driver to turn the face backwardly during the backward running of his vehicle. Accordingly, in view of an easier driving at the time of a backward run, it is desirable that the backward running speed of the vehicle does not exceed a certain level.

To this end, there has been proposed a motor tricycle with a reverse mechanism in Japanese Laid-open Patent Publication No. 59155545, in which the motor tricycle is provided with a vehicle speed limiting device which is actuated upon detection of a reverse operation, and adapted to limit the backward running speed of the motor tricycle to be less than a certain speed rate. The vehicle speed limiting device comprises a vehicle speed detection circuit for detecting a vehicle speed, a reverse detection circuit for detecting a reverse operation, a discrimination circuit for emitting an output signal at a higher speed than a predetermined vehicle speed set for a reverse running time by discriminating signals emitted from both the detection circuits, and an ignition stopping circuit for stopping the actuation of an ignition device for engine according to the output signal from the discrimination circuit, and the engine is flamed out at a higher speed than the predetermined vehicle speed set for a reverse running time, so that the vehicle speed will be limited to a level less than the predetermined vehicle speed even if an accelerator grip mounted on a handle bar is turned.

SUMMARY OF THE INVENTION

It is therefore an object of the present invention to provide a vehicle speed control device, wherein a vehicle speed can be more directly and effectively limited to be less than a predetermined speed rate instead of providing various electronic circuits as in the case of a conventional device described in which the vehicle speed is limited by controlling an engine, etc. through the signals emitted from the circuits.

It is another object of the invention to provide a device which functions as a reverse speed limiting device when a vehicle runs backwardly, and as a vehicle speed sensor for emitting a vehicle speed signal to a device which is actuated in response to a vehicle speed when the vehicle runs forwardly.

A speed control device according to the present invention comprises a pump adapted to discharge a fluid at a predetermined flow rate in response to a vehicle speed in one direction or the other direction according to a forward and a backward running of a vehicle, a brake pipe adapted to introduce the fluid discharged from the pump into a vehicle wheel braking device, and a brake restricting means adapted to release the discharged fluid from the brake pipe when a flow rate of the discharged fluid from the pump is found to be less than a predetermined rate, so that the vehicle wheel braking device will be actuated at a vehicle speed higher than a predetermined level.

According to the present invention, the pump is actuated in response to the operation of a vehicle to feed a fluid into the brake pipe. The discharge rate of the pump is generally proportionate to the vehicle speed, or changes progressively depending on desired conditions. On the other hand, since the fluid within the brake pipe is released to, for example, the upper stream side of the pump at a predetermined flow rate, if the flow rate of the fluid fed by the pump is less than the predetermined flow rate, in other words, if the vehicle speed is less than the predetermined rate, pressure within the brake pipe is not increased. However, when the vehicle speed exceeds the predetermined rate and the discharge exceeds the afore-mentioned predetermined flow rate, the pressure within the brake pipe is increased, and due to the foregoing pressure, the vehicle wheel braking device is actuated to brake the vehicle wheels, thus decelerating the vehicle speed. The deceleration of the vehicle speed causes the discharging fluid rate of the pump to decrease. As a result, the pressure within the brake pipe is lowered to release the braking of the vehicle wheels. In this way, the vehicle speed is automatically controlled so as not to exceed a predetermined speed rate.

From another aspect of the present invention, the discharged fluid of the pump is fed into the brake pipe when the vehicle moves backwardly to limit the reverse speed. And, when the vehicle runs forwardly, the discharged fluid of the pump is fed into a control pipe. This control pipe is connected to a control device such as, for example, a vehicle speed sensing portion of a power steering device, which responds to the forward running speed, and the control device senses the fluid fed through the control pipe to effect a controlling action. That is, in this case, the device according to the present invention functions as a vehicle speed sensor.

DETAILED DESCRIPTION OF THE PREFERRED EMBODIMENTS

Figure 1:
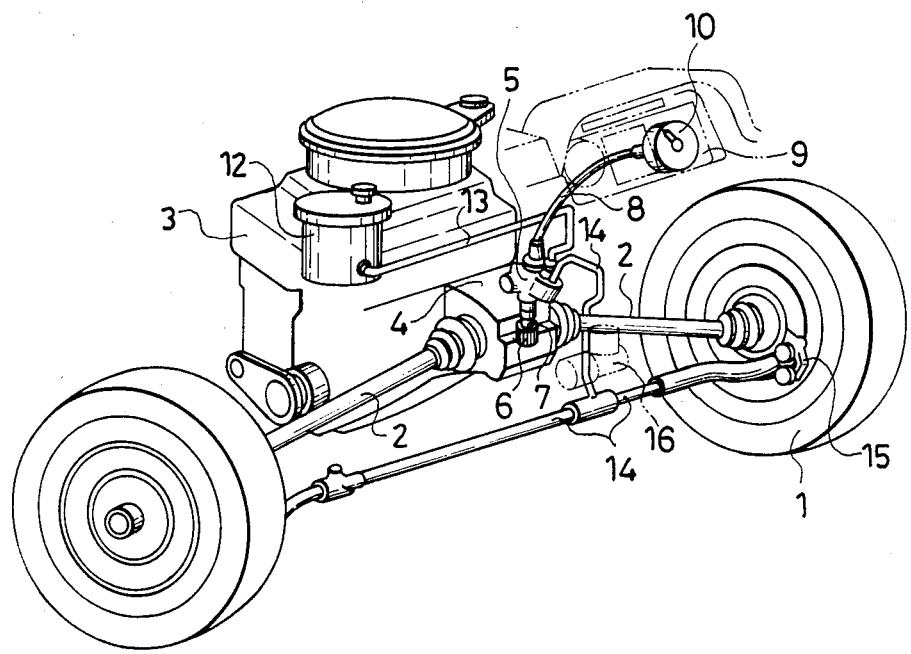
FIG. 1 is a persepective view, when viewed from backwardkly, of a front wheel portion of an automobile to which the present invention is applied.

A preferred embodiment of the present invention will be described hereunder with reference to the accompanying drawings. The drawings illustrate by way of example a front drive automobile to which the present invention is applied. FIG. 1 is a perspective view of the front wheel portion when viewed from the rear portion of the vehicle. Right and left front wheels 1, 1 are connected to a transmission portion 4 at a rear portion of an engine 3 through axles 2, 2, respectively, and driven by the engine 3. The transmission portion 4 is mounted with a vehicle speed take-off portion 5 and a pinion 6 of the latter engages a final drive system of the engine 3 so that the vehicle speed can be taken off the as number of rotations of a shaft 7. The shaft 7 is connected to one end of an inner wire permitted to pass through the interior of a speedometer cable 8. The other end of the inner wire is connected to a speedometer 10 provided on an instrument panel 9 at a driver's seat in order to drive a needle of the speedometer to indicate the vehicle speed.

The vehicle speed take-off portion 5 is a built in with a pump 11 (FIG. 4) as will be described hereinafter. The pump 11 is driven by the shaft 7 at a speed corresponding to the vehicle speed. The pump 11 is fed with oil, i.e. fluid from an oil tank 12 through a feed pipe 13. The fluid discharged from the pump 11 is fed to vehicle wheel braking members 15, 15 such as disc brakes, etc. mounted on the front wheels 1, 1, respectively, via a brake pipe 14 to actuate vehicle wheel braking members 15. The brake pipe 14 may also be connected to a vehicle wheel braking member (not shown) of rear wheels in order to simultaneously brake the rear wheels.

Figure 2:
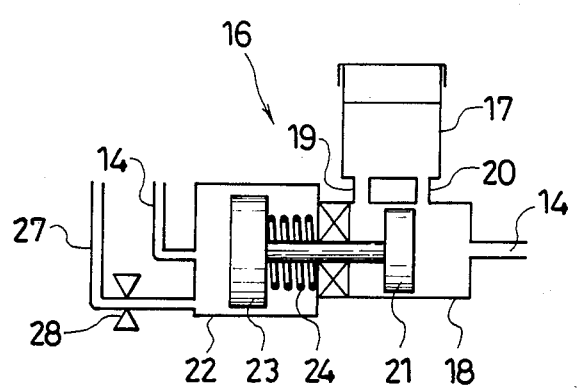
FIG. 2 is a sectional view of a cylinder device.
Figure 3:
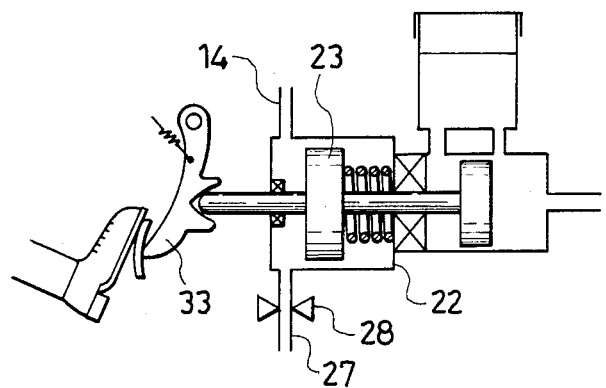
FIG. 3 is a sectional view showing a modified embodiment of the cylinder device.

In the case the discharge rate and the discharging pressure of the pump 11 are different from those required by a brake piston of the vehicle wheel braking member 15, they can be increased or decreased by a cylinder device 16 interposed in the brake pipe 14 to actuate the vehicle wheel braking member 15. In this case, the cylinder device 16 and the vehicle wheel braking member 15 constitute the vehicle wheel braking device. Alternatively, the vehicle speed take-off portion 5 may be mounted on a portion such as, for example, a final gear of a power transmission mechanism or an outer gear of a differential mechanism which rotates in proportion to number of rotation of the vehicle wheels, and the pump may be connected thereto. The cylinder device 16, as shown in FIG. 2, includes a reservoir 17 and a cylinder 18 which are communicated through a feed port 19 and a relief port 20. Slidably inserted into the cylinder 18 is a piston 21. A rightward movement of the piston 21 causes a brake fluid within the cylinder 18 to be pressurized and fed to the vehicle wheel braking member 15. Adjacent to the cylinder 18 but separated in a liquid-tight manner therefrom, an operating cylinder 22 is disposed. Within the operating cylinder 22, an operating piston 23 integrally formed with the piston 21 is slidably inserted. Piston 21, and operating piston 23 are energized leftwardly by a spring 24. The other side of the operating cylinder 22 with respect to the cylinder 18 is connected to the brake pipe 14. The operating piston 23 is pushed rightwardly by fluid pressure within the brake pipe 14. According to the foregoing movement of the piston 23, the piston 21 feeds a brake fluid within the cylinder 18 to the vehicle wheel braking member 15 under pressure through the brake pipe 14 at the vehicle wheel braking member 15 side. At this time, the ratio between the pressure of the fluid fed into the operating cylinder 22 and the pressure of the brake fluid discharged from the cylinder 18 is in inverse proportion to the dimensional ratio between the operating piston 23 and the piston 23. Accordingly, by properly selecting the dimensional ratio between both the pistons 23 and 21, a required increased or decreased force effect can be obtained. As shown in FIG. 3, the operating piston 23 may be connected with an operating member 33 such as a brake pedal to use the cylinder device 16 as a master cylinder for a usual braking device.

Figure 4:
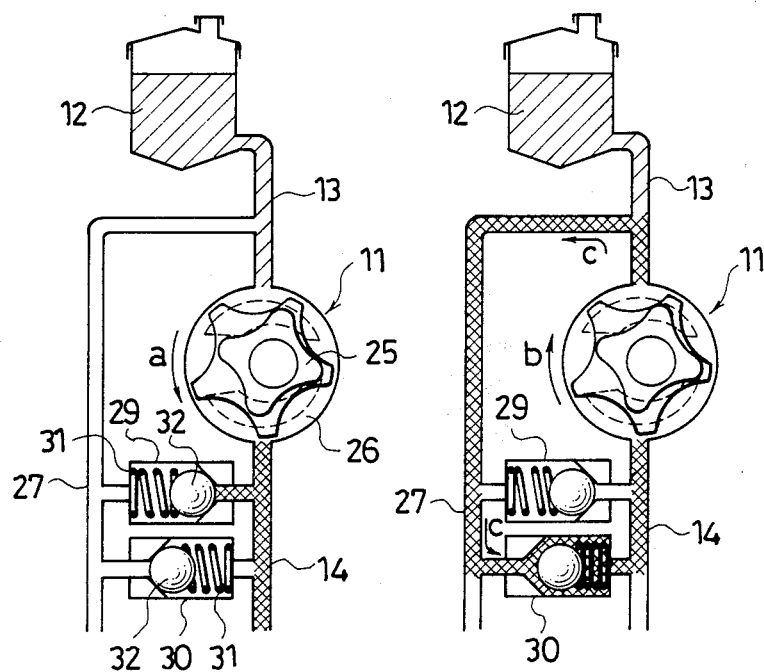
FIGS. 4(1) and 4(2) are a piping system diagram around a pump.

FIG. 4 illustrates a piping system diagram around the pump 11. The pump 11 may be of the type which changes its discharging direction of fluid depending on rotating direction such as, for example, trochoid pump, gear pump, etc. In the present embodiment, the pump 11 is, as shown in the figure, a trochoid pump comprising an inner rotor 25 and an outer rotor 26 formed according to a trochoidal curve. Both the rotors 24 and 26 are eccentrically built in a casing, and the rotation of the inner rotor 25 causes the outer rotor 26 to rotate in the same direction. Since the number of teeth of the inner rotor 25 is less than that of the outer rotor 26 by one, there is formed a space corresponding to one tooth. This space is changed in its capacity due to rotation of the rotors to effect a pump action. This pump 11 is built in the vehicle speed take-off portion 5 as described in the foregoing, and rotated in proportion to the vehicle speed. When in reverse movement of the vehicle, the pump 11 is rotated in the direction as shown by an arrow a in FIG. 4(1) to feed the fluid from the feed pipe 13 side to the brake pipe 14 side. When in forward movement of the vehicle, the pump 11 is rotated in the direction as shown by an arrow $b$ in FIG. 4(2) to feed the fluid from the brake pipe 14 side to the feed pipe 13 side.

Now, a description will be made on an example wherein the cylinder device 16 is interposed in the brake pipe 14. The brake pipe 14 of FIG. 4 is connected to the brake pipe 14 at the operating cylinder 22 side of FIGS. 2 and 3. The operating cylinder 22 is, as shown in FIGS. 2 and 3, connected with a discharge pipe 27. The discharge pipe 27 is, as shown in FIG. 4, communicated with the feed pipe 13. The discharge pipe 27 is provided with an orifice 28. By throttling the sectional dimension of the tube with this portion, the flow rate of the fluid flowing within the discharge pipe 27 can be limited to be less than a predetermined rate.

Between the discharge pipe 27 and the brake pipe 14, a relief valve 29 and a one-way valve 30 are disposed in parallel relation with respect to each other. These valves 29 and 30 are of the type, wherein a valve port is blocked with a ball 32, biased toward one direction by a spring 31. An arrangement is such that when the differential pressure between both the pipes 27 and 14 overcomes the spring 31, the relief valve 29 permits a flow from the brake pipe 14 to the discharge pipe 27, and the one-way valve 30 permits a flow from the discharge pipe 27 to the brake pipe 14.

Since the present embodiment is constituted as described in the foregoing, when the vehicle moves backwardly, the pump 11 is rotated counter-clockwise as shown by an arrow a in FIG. 4 (1). As a result, the fluid within the oil tank 12 is intaken by the pump 11 via the feed pipe 13 and discharged into the brake pipe 14 from the pump 11. And, the fluid within the brake pipe 14 is fed into the operating cylinder 22. However, when the backward moving speed of the vehicle is slow, the discharge of the pump 11 is small. Accordingly, a certain quantity of the fluid corresponding to the quantity fed into the brake pipe 14 is recirculated to the feed pipe 13 from the operating cylinder 22 via the orifice 28 and the discharge pipe 27. Accordingly, the internal pressure of the brake pipe 14 and operating cylinder 22 is not increased. Consequently, the operating piston 23 and the piston 21 are not actuated, and the vehicle wheel braking member 15 is not actuated, either. That is, the discharge pipe 27 and the orifice 28 constitute brake restricting means. When the vehicle speed exceeds a certain level, the discharge of the pump 11 exceeds the fluid which is relieved to the feed pipe 13 passing the orifice 28. As a consequence, the internal pressure of the brake pipe 14 and the operating cylinder 22 is increased. Due to the increased internal pressure, the operating piston 23 causes the piston 21 to move rightwardly. As a result, the brake liquid is fed under pressure to the vehicle wheel braking member 15 by the piston 21. As a result, the vehicle wheel braking member 15 is braked to lower the vehicle speed. As a consequence, number of rotation of the pump 11 is also decreased to reduce the discharge thereof. And, the pressure of the operating cylinder 22 is lowered due to the circulating fluid to the feed pipe 13 via the orifice 28 and the discharging pipe 27. As a result, the vehicle wheel braking member 15 is relieved.

In this way, since the vehicle speed at the time when the vehicle moves backwardly is automatically maintained to be less than a predetermined value, a burden on a driver at the time when the vehicle moves backwardly is reduced extensively. The relief valve 29 is provided in order to prevent a sudden brake and a sudden stop. When the pressure within the brake pipe 14 is abnormally increased, the relief valve 29 is opened to discharge the fluid within the brake pipe 14 into the discharge pipe 27. The same is applicable to the case wherein the braking action is effected without the cylinder device 16. In this case, the discharge pipe 27 having the orifice 28 is connected to the vehicle wheel braking member 15 or the brake pipe 14.

When the vehicle moves forwardly, as shown in FIG. 4(2), the pump 11 is rotated in the direction as shown by an arrow b to discharge the fluid within the brake pipe 14 to the feed pipe 13 side. At this time, the one-way valve 30 is opened for permitting the fluid to circulate through the discharge pipe 27 and the one-way valve 30 as shown by an arrow c. Thus, the reverse speed control device according to the present invention is not adversely affected at all.

Figure 5:
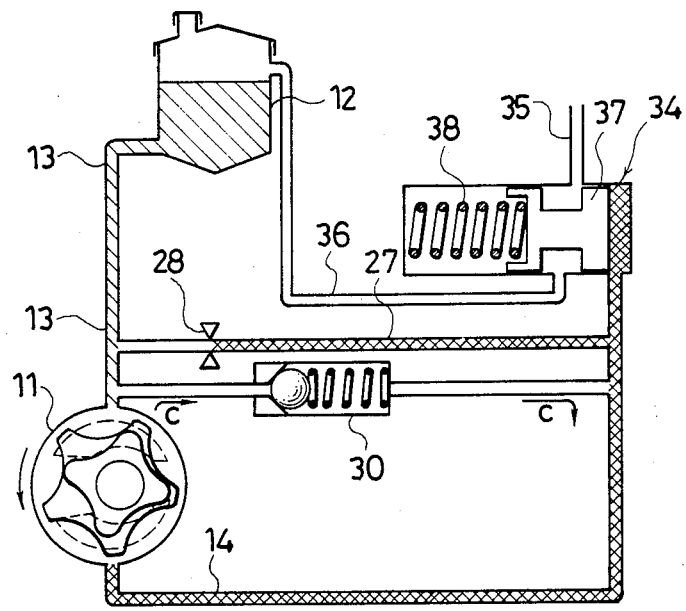
FIG. 5 is a piping system diagram around a pump according to another embodiment of the present invention.

FIG. 5 illustrates a piping system diagram around a pump according to another embodiment of the present invention. In this embodiment, the brake pipe 14 is interposed with a cut-off valve 34. An outlet pipe line 35 of this cut-off valve 34 is connected to the vehicle wheel braking member 15 through the cylinder device 16, or otherwise directly connected thereto without the cylinder device 16. The cut-off valve 34 is provided with a return pipe line 36, which is communicated with the oil tank 12 side. The piston 37 of the cut-off valve 34 is energized by a spring 38 rightwardly in the figure. Usually, as shown in FIG. 5, the piston 37 serves to cut off communication between the brake pipe 14 and the outlet pipe line 35, and permit intercommunication between the outlet pipe line 35 and the return pipe line 36. The feed pipe 13 and the braking pipe 14 are interconnected by the discharge pipe 27, in which an orifice 28 similar to the one used in the preceding embodiment is disposed. Also, between the feed pipe 13 and the brake pipe 14, a one-way valve 30 similar to the one used in the preceding embodiment is disposed.

Figure 6:
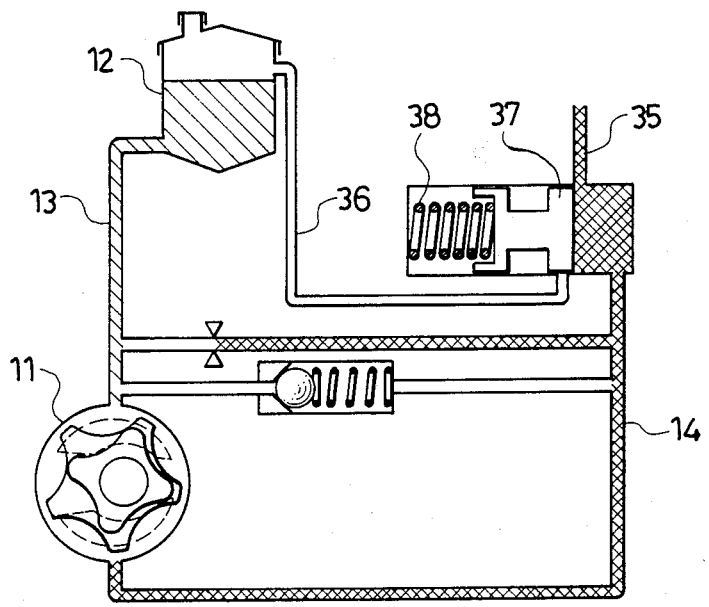
FIG. 6 is a similar view to FIG. 5 showing a state when the braking is effected.

In this embodiment, the pump 11 also serves to discharge the fluid to the brake pipe 14 side when the vehicle moves backwardly. When the vehicle runs at a low speed, as same in the case of the preceding embodiment, the pressure within the brake pipe 14 is not increased more than a predetermined value due to the effect of the orifice 28, and the vehicle braking member 15 is not actuated since the communication between the brake pipe 14 and the outlet pipe line 35 is cut off by the cutoff valve 34. When the reverse speed increases and exceeds a predetermined value, the piston 37 is moved leftwardly due to pressure increase of the brake pipe 14, and as shown in FIG. 6, since the brake pipe 14 and the outlet pipe line 35 are communicated with each other, the vehicle wheel braking member 15 is actuated. As a result, when the vehicle speed is decreased, the pressure within the brake pipe 14 is lowered due to decrease of the discharge of the pump 11. As a result, the piston 37 of the cutoff valve 34 is returned to a position of FIG. 5, the fluid from the vehicle wheel braking member 15 or the cylinder device 16 is returned to the oil tank 12 side via the outlet pipe line 35 and the return pipe line 36, and the vehicle braking member 15 is relieved. When a pressure which overcomes the spring 38 is produced within the brake pipe 14 during backward movement of the vehicle, the piston 37 is moved leftwardly in FIG. 6 and acts as a relief valve for permitting a flow from the brake pipe 14 to the return pipe line 36. The pump 11 feeds the fluid from the brake pipe 14 side to the feed pipe 13 side when the vehicle runs forwardly. This fluid circulates through the one-way valve 30 as shown by an arrow c in FIG. 5.

Although a reverse speed control device has been described in the above preferred embodiment, the present invention is not limited to the reverse speed control device. The present invention is likewise applicable to a speed control device which is to be used when the vehicle runs forwardly by suitably redesigning without departing from the spirit of the present invention.

Figure 7:
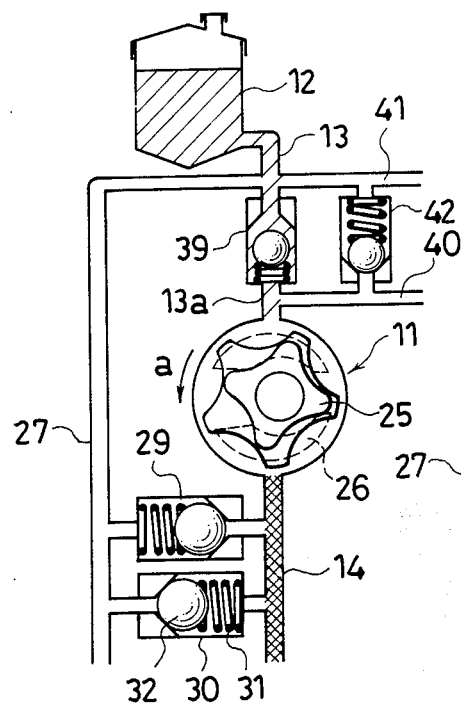
FIGS. 7(1) and 7(2) are a piping system diagram around a pump according to another embodiment of the present invention.
Figure 7:
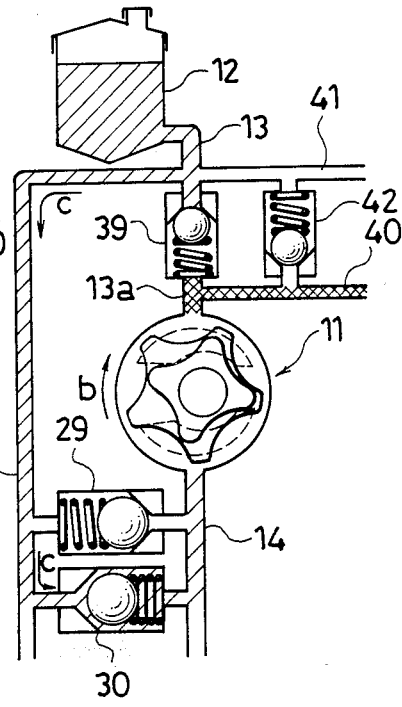

Next, another embodiment of the present invention will be described with reference to FIG. 7. In FIG. 7, like portions of the preceding embodiments will be denoted by like reference numerals and description on such portions will be suitably omitted.

In this embodiment, the feed pipe 13 is inserted with a one-way valve 39. The fluid within the pipe 13 flows from the oil tank 12 toward the pump 12 but does not flow from the pump 11 toward the oil tank 12. And, a control pipe 40 is branched from the feed pipe portion 13a between the one-way valve 39 and the pump 11. This control pipe 40 is connected to a vehicle speed responsive control device such as, for example, a vehicle speed responsive portion of a power steering device, or a hydraulic control lean device for leaning the vehicle body according to a vehicle speed at the time when the vehicle is turning, or an automatic control device for controlling the forward running speed of the vehicle to be less than a predetermined value, or the like. Between these vehicle speed responsive control devices and the feed pipe 13, a discharge pipe 41 similar to the aforementioned discharge pipe 27 is disposed, and between the discharge pipe 41 and the control pipe 40, a relief valve 42 similar to the afore-mentioned relief valve 29 disposed.

Since the present embodiment is constituted as described in the foregoing, when the vehicle runs backwardly, the pump 11 is rotated counter-clockwise as shown by an arrow a in FIG. 7(1). The fluid within the oil tank 12 is intaken by the pump 11 via the feed pipe 13 and the one-way valve 39, and discharged from the pump 11 to the brake pipe 14. And, the reverse speed of the vehicle is limited to less than a predetermined value as in the same manner as described in the foregoing embodiments.

When the vehicle runs forwardly, as shown in FIG. 7(2), the pump 11 is rotated in the direction as shown by an arrow b, and the fluid within the brake pipe 14 is discharged to the feed pipe 13a side. At this time, the one-way valve 39 is shut and the one-way valve 30 is opened. Accordingly, the fluid within the oil tank 12 is, as shown by an arrow c, intaken by the pump 11 via the discharge pipe 27, the one-way valve 30 and the brake pipe 14, and discharged to the control pipe 40 by the pump 11. Then, the fluid is fed to the various vehicle speed responsive control devices as described in the foregoing, and utilized as a vehicle speed signal. In this way, the pump 11 functions as a reverse speed control device when the vehicle runs backwardly, and as a sensor for the vehicle speed responsive control devices when the vehicle runs forwardly.

What is claimed is:

1. A reverse speed control device for a vehicle, comprising:
    a pump discharging a fluid in one direction in response to forward movement of the vehicle and in another direction in response to reverse movement of the vehicle, said fluid being discharged at a flow rate proportional to the vehicle speed;
    a brake pipe operatively connected to said pump for receiving fluid discharged from said pump when the vehicle is in reverse, said brake pipe being operatively connected to a wheel braking device actuated by fluid pressure applied thereto;
    a cutoff valve interposed between said brake pipe and said wheel braking device, such that said cutoff valve is biased to a closed position to operatively cut off fluid pressure in said brake pipe from said wheel braking device when the pressure in said brake pipe is below a predetermined pressure, and such that when the pressure in said brake pipe is greater than said predetermined pressure, said cut off valve is biased to an open position to operatively connect the fluid pressure in said brake pipe with said wheel braking device to allow said fluid to act on said wheel braking device to automatically brake a vehicle wheel when said fluid pressure exceeds said predetermined pressure when said vehicle is in reverse;
    a return pipe connected to said cut off valve such that fluid in said wheel braking device is returned to a fluid reservoir when said cut off valve is biased to said closed position;
    a brake restricting means for releasing fluid in said brake pipe when a flow rate of the fluid discharged from said pump into said brake pipe is less than a predetermined rate to prevent a rise of fluid pressure in said brake pipe.
2. A device according to claim 1, wherein said vehicle wheel braking device includes a cylinder device connected to said brake pipe and actuated by said discharged fluid to feed a fluid pressure to a braking member provided at vehicle wheels.
3. A device according to claim 1, wherein said brake restricting means comprises an orifice disposed in a discharge pipe communicating with said brake pipe and adapted to return the discharged fluid within said brake pipe to an intake side of said pump.

* * * * *